United States Patent [19]
Chubb

[11] 3,822,462
[45] July 9, 1974

[54] METHOD OF CONSTRUCTING DOOR AND WINDOW STRUCTURES

[76] Inventor: Wingfield L. Chubb, Faircroft Engineering, Inc., Beverly Shores, Ind. 46304

[22] Filed: Nov. 8, 1972

[21] Appl. No.: 304,721

[52] U.S. Cl.............. 29/416, 52/208, 113/116 BB, 113/116 I
[51] Int. Cl........................................... B23p 17/00
[58] Field of Search.......... 29/416, 462; 113/116 C, 113/116 I, 116 BB; 52/208

[56] References Cited
UNITED STATES PATENTS

| | | | |
|---|---|---|---|
| 932,341 | 8/1909 | Smith | 113/116 BB |
| 2,154,596 | 4/1939 | Widman | 29/416 |
| 3,540,113 | 11/1970 | Krutzikowsky | 29/416 X |
| 3,552,341 | 1/1971 | Lannin | 29/416 X |
| 3,616,518 | 11/1971 | Hundy | 29/416 X |

Primary Examiner—Charles W. Lanham
Assistant Examiner—Victor A. DiPalma
Attorney, Agent, or Firm—Hobbs & Green

[57] ABSTRACT

A door and window structure in which a plastic frame is adapted to be secured to the opening structure of a recreational vehicle, mobile home or the like, and a panel of plastic material, severed from the frame, forms the door or window. The method includes forming, from a single sheet or panel, an integral frame and door or window and severing the door or window pane from the frame, the cut preferably being made in the edgewise direction from a joint between the frame and panel so that the panel overlaps the frame when the panel and frame are assembled in place.

4 Claims, 11 Drawing Figures

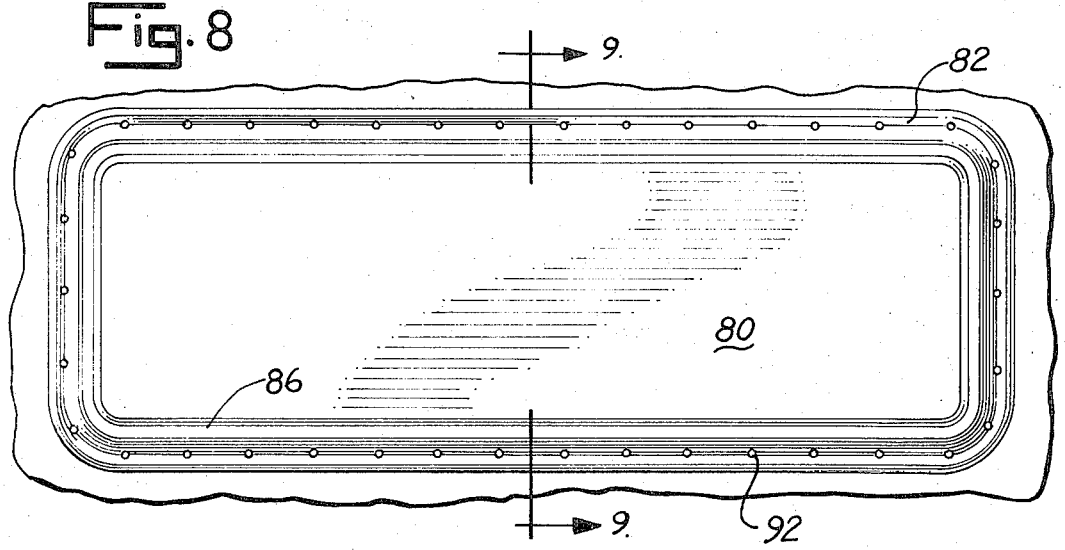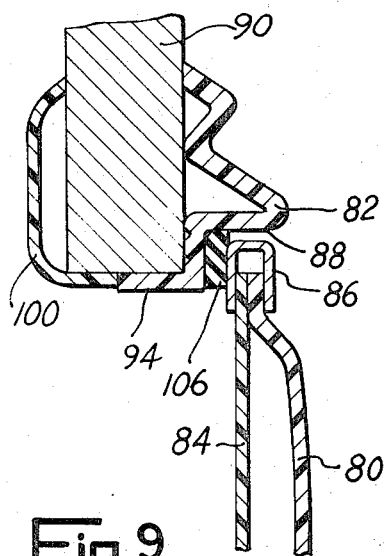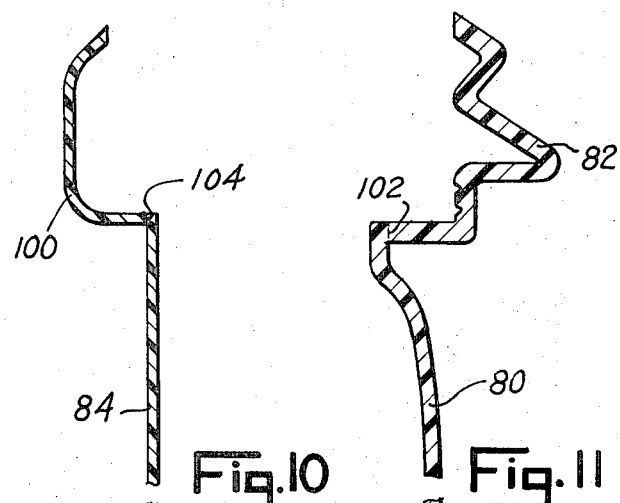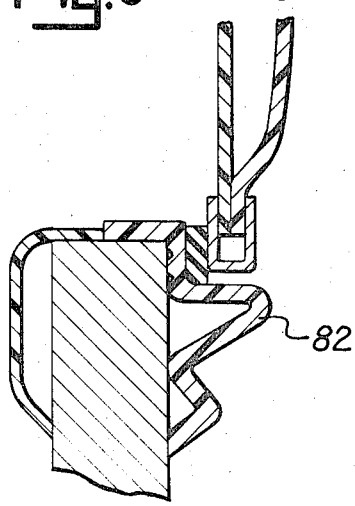

METHOD OF CONSTRUCTING DOOR AND WINDOW STRUCTURES

The conventional trunk door and window construction used in recreational vehicles, such as travel trailers, consists of a glass panel with a metal frame, and an outer metal frame which is secured in and around the opening in the side or end wall of the vehicle to which the glass panel frame is secured by a hinge disposed between the two frames. The hinge may be placed between the upper sections of the two frames to form an awning type of window or door, and preferably extends substantially throughout the length of the upper frame section. The metal used in constructing the two frames normally consists of extruded aluminum which is either cut into sections and riveted together to form the frames, or the inner frame may be wrapped around curved corners of the glass panel to form a single piece frame and the outer frame shaped to receive the assembled glass panel and frame. Both types of conventional window construction are difficult and/or expensive to fabricate and often lack the strength and ruggedness to withstand normal usage of the vehicle without breaking or becoming loose at the joints and hinges. It is therefore one of the principal objects of the present invention to provide a door and window structure which is particularly adapted and suited for travel trailers and similar vehicles, and which is economical to construct and easily maintained in good operating condition.

Another object of the invention is to provide a door and window structure consisting principally of plastic material, and having an outer frame formed initially as an integral part of the window pane, and then severed therefrom for installation in the wall window opening for use with the same window pane.

A further object of the invention is to provide a plastic thermal pane construction having two spaced panes, the outer pane being formed initially as an integral part of the outer frame and then severed therefrom, and the inner pane being formed initially as an integral part of inside garnish for the window and then severed therefrom.

Still another object of the invention is to provide a door and window structure for vehicles, such as travel trailers, campers and the like, which is simple and durable in construction and which can be conveniently fabricated from standard stock material with relatively little scrap.

Another object is to provide a method for producing doors and windows of the foregoing construction having a pane portion and an outer frame, which is easy and simple to perform and which effectively utilizes substantially all the stock material from which the structure is fabricated.

Additional objects and advantages of the present invention will become apparent from the following description and accompanying drawings, wherein:

FIG. 8 is an elevational view of one of the windows seen in FIG. 1;

FIG. 9 is a vertical cross-sectional view of the window seen in FIG. 8, the section being taken on line 9—9 of the latter figure; and FIGS. 10 and 11 illustrate the manner in which the window panes and frames for the window are fabricated.

Figure 1:
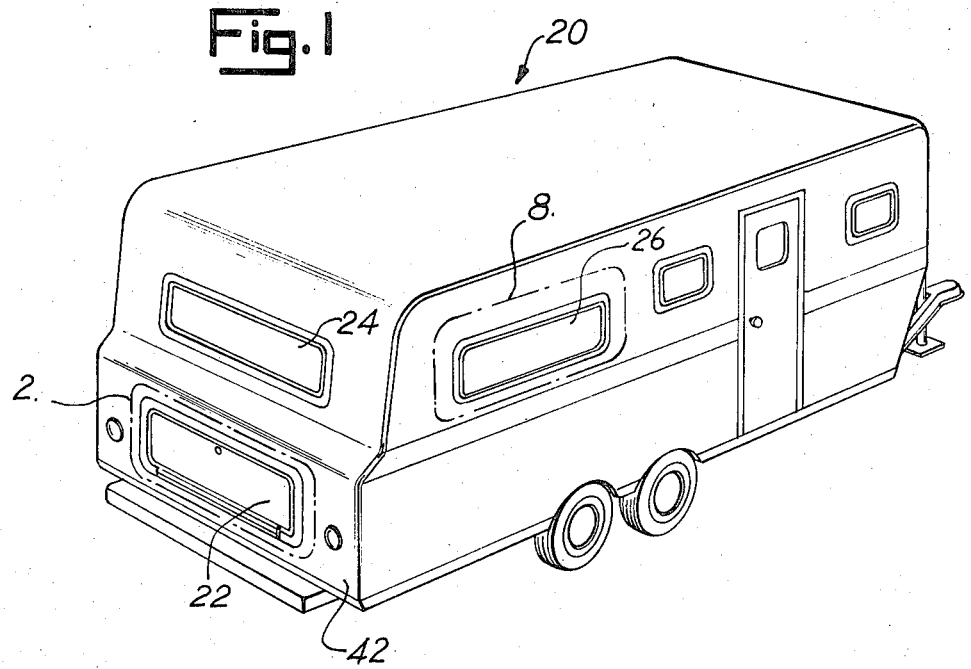
FIG. 1 is a perspective view of a camper having windows of the type forming the subject matter of the present invention.

Referring more specifically to the drawings and to FIG. 1 in particular, numeral 20 indicates generally a camper having a rear compartment door 22 and rear and side windows 24 and 26, and two windows 24 and 26 being essentially the same in construction. Both the windows and door referred to herein embody the present invention. The windows and doors are not only adapted for campers but may be used in various other types of recreational vehicles, and can be adapted to mobile homes or other building structures.

Figure 2:
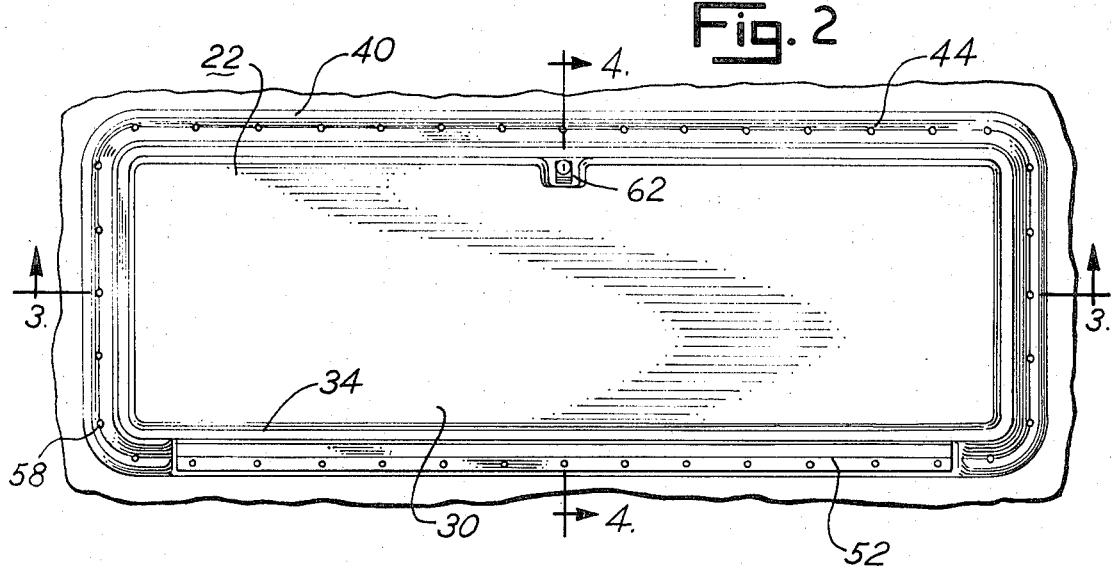
FIG. 2 is an enlarged view of the trunk door.
Figure 3:
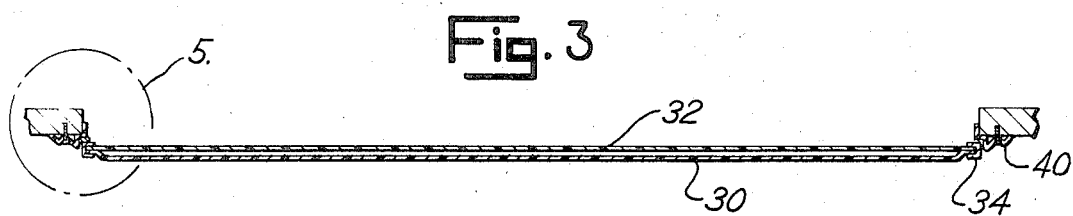
FIG. 3 is a horizontal cross-sectional view of the door shown in FIG. 2, the section being taken on line 3—3 of FIG. 2.
Figure 4:
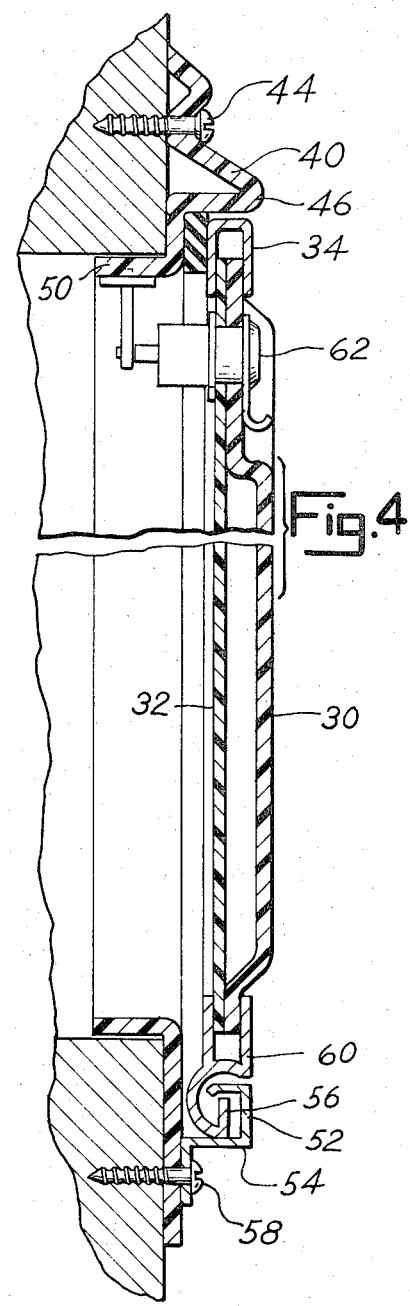
FIG. 4 is an enlarged vertical cross-sectional view through the door shown in FIGS. 2 and 3.

The door shown in FIG. 3 consists of an outer panel 30 and inner panel 32 secured together by a metal frame 34 which clamps the two panels together at the edges and forms, in effect, a thermal insulation type structure. A frame 40 seats in the opening in a rear wall 42 of the camper and is secured therein by a plurality of screws 44 extending through the frame into the wall structure. The frame has an outwardly protruding portion 46 which forms a recessed area into which the edges of the door seat when it is fully closed. The frame also has a flange 50 which extends inwardly around the basic structure of the wall defining the door opening. The door is pivotally secured to the frame by hinge structure 52, consisting of elongated interlocking metal parts 54 and 56, the former being secured to the door frame by a plurality of screws 58, and the latter being pivotally interlocking with portion 54 and secured rigidly to the margin of the door by frame portion 60. The frame 34 firmly clamps the two panels together so that a rigid structure is formed and is preferably continuous around the window with curved corners, as is best illustrated in FIG. 2. The plastic forming the panels 30 and 32 and frame 40 for the door shown, may be of any suitable plastic material, either transparent or translucent; however, when the door and frame structure is used for a trunk door, an opaque material is preferably used. If desired, a translucent or transparent plastic material may be used and the inner side thereof painted or otherwise coated to render the structure opaque. The door may have any suitable type of lock 62, such as that shown in FIG. 4; however, the manner in which the door is secured does not form an essential part of the present invention.

Figure 5:
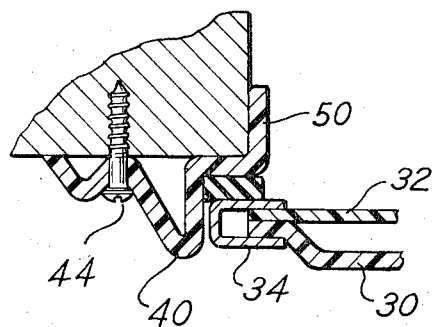
FIGS. 5, 6 and 7 show the construction of the door illustrated in the previous figures, FIGS. 6 and 7 illustrating the manner in which the door panel and door frame are fabricated and FIG. 5 illustrating the manner in which the parts thereof are assembled.
Figure 6:
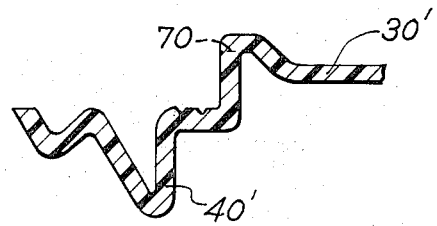
Figure 7:
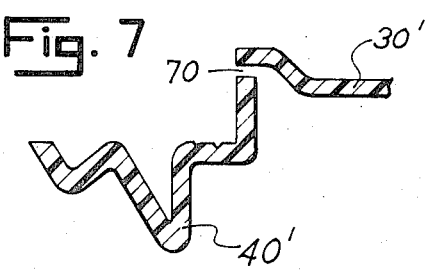

The method for forming the door is considered an important part of the present invention, in that the method makes it possible to produce a door of this type very economically without any substantial waste of material which would normally be necessary where the frame is constructed of plastic material and is continuous. The method is best illustrated in FIGS. 5, 6 and 7, FIG. 6 showing the door panel and frame as it is in an intermediate stage. The frame, indicated by numeral 40' in FIG. 6, is formed as an integral part of panel 30'. Thus a large sheet of plastic material can be formed into the panel and frame configuration in one operation with no loss of material which would normally result if the frame were formed separately and the center discarded. The frame 40 and panel 30 are severed from one another on a line indicated by numeral 70 to separate the two parts as illustrated in FIG. 7. After the panel and frame have been separated, the frame can then be secured in the opening in the wall of the camper, in the manner illustrated in FIG. 5, and panel 30 assembled in frame 34, either with or without inner panel 32. The purpose of inner panel 32 is primarily to provide thermal insulation resulting from the space between the two panels. However, in some constructions the additional thermal protection is not required and panel 32 can thus be eliminated.

By severing the panel on line 70, the panel extends laterally sufficiently that it overlaps the inner portion of the frame when the two are assembled, as can be readily seen by comparing the inner side of flange 50 with the position of the end of panel 30. Various frame configurations may be used in combination with the panels. The foregiong method of forming the frame and panel from a single sheet and then severing the frame from the panel is an efficient and economical way of producing the complete door structure.

In the embodiment of the invention illustrated in FIGS. 8 through 11, a thermal pane window is constructed of plastic material and the frame on the external side and the garnish on the internal side are formed from the two panes forming a window. Numeral 80 designates the external pane and 82 the external frame of the window. The pane and frame are both similar to the pane and frame 30 and 40. An inner pane 84 is joined to the outer pane 80 by channel member 86 clamped to the margin of the two panes, thereby holding the two panes firmly together and forming a rigid structure which can be inserted in recess 88 of frame 82. The frame is secured to the wall structure 90 by a plurality of screws 92 and contains an inwardly extending flange 94. The garnish 100 provides the finish on the inside of the frame of the window and is secured to wall 90 by screws or any other suitable securing means. FIG. 10 and 11 illustrate the manner in which the panes 80 and 84, the frame 82 and garnish 100 are formed, the frame being formed as a part of panel 80 and garnish 100 being formed as a part of panel 84. The numerals 102 and 104 indicate the lines on which the frame is severed from panel 80 and the garnish from panel 84; thus, with the method used, the two panels and respective frame and garnish are formed from one large initially flat sheet of plastic material, and the formed parts separated from one another.

Since the panes 80 and 84 are used for windows, they are normally constructed of transparent plastic, and hence the frame and garnish are likewise of transparent plastic. In order to eliminate the transparency of the frame and garnish and to obtain the desired color for most effective trim for the windows inside and out, the frame and garnish are painted or otherwise coated on the internal surface to give the proper or desired color to these parts. While they may be painted or otherwise coated externally, the painting or coating on the inside provides a most satisfactory appearance as well as protection to the coated surface.

The window may be the type that can be opened by mounting it on a hinge, or it may be permanently secured closed. A gasket 106 is normally used with the window structure, consisting of panels 80 and 84 and middle channel strip 86. While the frame and garnish are shown in the particular configuration of the drawings, various other configurations may be used to satisfy requirements. In the window construction as well as in the door construction, only one panel, such as panel 80 and the frame therefor, may be used if desired; however, in using the one panel and eliminating the inner pane, the garnish which is normally formed with the inner pane is not obtained by this method. In a complete window as illustrated in FIG. 9, the two panels and their respective borders are required.

A variety of plastic materials may be used in the construction of the window, such as an acrylic resin such as Lucite or Lexon, where the transparency of the panes is necessary or preferred. However, where transparency is not required or perhaps undesirable, polyethylene, for example, may be used if desired.

While only two embodiments of the door and window construction and method therefor have been described in detail herein, various changes and modifications may be made without departing from the scope of the invention.

I claim:

1. A method of manufacturing a door or window structure comprising forming from a flat sheet of plastic material an integral panel and continuous peripheral frame with the frame being joined to said panel at right angles to the panel, cutting the frame from the panel at the periphery of the panel in the direction radially outwardly from the panel and assembling the panel within the confines of the frame in overlapping relationship therewith.

2. A method of manufacturing a door or window structure as defined in claim 1 which includes the steps of forming a recess in said frame and a flange on said frame extending at generally right angles to said panel.

3. A method of manufacturing a door or window structure as defined in claim 2 in which the panel and frame are severed at the corner at the right angle in such a manner that the panel overlaps the inner edge of said frame.

4. A method of manufacturing a door or window structure as defined in claim 1 in which said sheet is transparent and an opaque coating is applied to the inner surface of the frame formed therefrom.

* * * * *